(12) United States Patent
Calilung et al.

(10) Patent No.: US 9,122,078 B2
(45) Date of Patent: Sep. 1, 2015

(54) RELEASABLE EARSTEM MOUNTING MECHANISM FOR EYEWEAR

(71) Applicant: Oakley, Inc., Foothill Ranch, CA (US)

(72) Inventors: Ryan Calilung, Irvine, CA (US); An Tran, Austin, TX (US)

(73) Assignee: Oakley, Inc., Foothill Ranch, CA (US)

( * ) Notice: Subject to any disclaimer, the term of this patent is extended or adjusted under 35 U.S.C. 154(b) by 183 days.

(21) Appl. No.: 13/689,636

(22) Filed: Nov. 29, 2012

(65) Prior Publication Data

US 2013/0141689 A1    Jun. 6, 2013

Related U.S. Application Data

(60) Provisional application No. 61/565,943, filed on Dec. 1, 2011.

(51) Int. Cl.
*G02C 5/14* (2006.01)
*G02C 5/22* (2006.01)

(52) U.S. Cl.
CPC *G02C 5/22* (2013.01); *G02C 5/146* (2013.01); *G02C 5/2209* (2013.01); *G02C 2200/08* (2013.01)

(58) Field of Classification Search
USPC .......................... 351/111, 116, 121, 140, 153
See application file for complete search history.

(56) References Cited

U.S. PATENT DOCUMENTS

| | | | |
|---|---|---|---|
| 245,268 A | 8/1881 | Andross | |
| 1,308,477 A | 7/1919 | Blanchard | |
| 1,588,775 A | 6/1926 | Schumacher | |
| 1,839,386 A | 1/1932 | Fischer | |
| 2,391,361 A | 12/1945 | Stevenson | |
| 2,504,157 A | 4/1950 | Rosenheim | |
| 2,652,746 A | 12/1950 | Shanks | |
| 2,610,323 A | 9/1952 | Johnson | |
| 3,214,767 A | 11/1965 | Weber | |
| 3,229,303 A | 1/1966 | Jonassen | |
| 3,395,964 A | 8/1968 | Chartrice | |
| 3,552,840 A | 1/1971 | Braget | |
| 3,691,565 A | 9/1972 | Galonek | |
| 3,826,564 A | 7/1974 | Werling, Sr. | |
| 3,901,589 A | 8/1975 | Bienenfeld | |
| 3,931,646 A | 1/1976 | Loughner | |
| 4,023,214 A | 5/1977 | Waldherr | |

(Continued)

FOREIGN PATENT DOCUMENTS

| | | |
|---|---|---|
| EP | 0121 018 | 10/1984 |
| EP | 0496 292 | 1/1991 |

(Continued)

OTHER PUBLICATIONS

International Search Report and Written Opinion in International Application No. PCT/US2012/067395, mailed Feb. 8, 2013 in 14 pages.

*Primary Examiner* — Jack Dinh
(74) *Attorney, Agent, or Firm* — Knobbe Martens Olson & Bear, LLP

(57) ABSTRACT

Eyewear can be provided which includes a frame and at least one earstem that can be removably coupled to the frame. The frame and/or the earstem can include a retention assembly and/or an engagement structure. For example, the earstem can include at least one prong extending from an anterior end thereof and a latch component that can collectively engage an engagement structure of the frame.

24 Claims, 13 Drawing Sheets

(56) References Cited

U.S. PATENT DOCUMENTS

| | | |
|---|---|---|
| 4,056,853 A | 11/1977 | Bottazzini et al. |
| 4,153,347 A | 5/1979 | Myer |
| 4,176,921 A | 12/1979 | Matthias |
| 4,264,987 A | 5/1981 | Runckel |
| 4,304,469 A | 12/1981 | Solomon |
| 4,314,814 A | 2/1982 | Deroode |
| 4,340,282 A | 7/1982 | Murakami |
| 4,357,080 A | 11/1982 | Solomon |
| 4,471,496 A | 9/1984 | Gardner, Jr. et al. |
| 4,515,448 A | 5/1985 | Tackles |
| 4,662,966 A | 5/1987 | Sumi et al. |
| 4,670,084 A | 6/1987 | Durand |
| 4,686,712 A | 8/1987 | Spiva |
| 4,730,915 A | 3/1988 | Jannard |
| 4,759,622 A | 7/1988 | Schmidthaler |
| 4,813,775 A | 3/1989 | Kaksonen |
| 4,822,158 A | 4/1989 | Porsche |
| 4,859,048 A | 8/1989 | Jannard |
| 4,867,550 A | 9/1989 | Jannard |
| 4,978,209 A | 12/1990 | Ohba |
| 4,983,030 A | 1/1991 | Chandler |
| 5,016,293 A | 5/1991 | Lickle |
| 5,048,944 A | 9/1991 | Porsche |
| 5,069,541 A | 12/1991 | Holmes et al. |
| 5,182,586 A | 1/1993 | Bennato |
| 5,182,587 A | 1/1993 | Hyoi |
| 5,208,614 A | 5/1993 | Jannard |
| 5,257,050 A | 10/1993 | Wiedner |
| 5,270,743 A | 12/1993 | Hofmair et al. |
| 5,308,426 A | 5/1994 | Claveau |
| 5,357,292 A | 10/1994 | Wiedner |
| 5,359,370 A | 10/1994 | Mugnier |
| 5,373,331 A | 12/1994 | Vallalla et al. |
| 5,387,949 A | 2/1995 | Tackles |
| 5,390,369 A | 2/1995 | Tubin |
| 5,400,089 A | 3/1995 | Danloup et al. |
| 5,410,763 A | 5/1995 | Bolle |
| 5,418,580 A | 5/1995 | Sondrol |
| 5,418,581 A | 5/1995 | Conway |
| 5,455,639 A | 10/1995 | Magdelaine et al. |
| 5,536,828 A | 7/1996 | Deluca et al. |
| 5,541,674 A | 7/1996 | Jannard |
| 5,576,775 A | 11/1996 | Bolle |
| 5,583,583 A | 12/1996 | Wilson |
| 5,587,747 A | 12/1996 | Bernheiser |
| 5,602,603 A | 2/1997 | Bondet |
| 5,617,588 A | 4/1997 | Canavan et al. |
| 5,641,372 A | 6/1997 | Okuno |
| 5,648,832 A | 7/1997 | Houston et al. |
| 5,689,323 A | 11/1997 | Houston et al. |
| 5,708,489 A | 1/1998 | Jannard |
| 5,760,866 A | 6/1998 | Wedeck et al. |
| 5,790,230 A | 8/1998 | Sved |
| 5,798,017 A | 8/1998 | Claveau |
| 5,805,261 A | 9/1998 | Houston et al. |
| 5,815,235 A | 9/1998 | Runckel |
| 5,862,529 A | 1/1999 | Moodie |
| 5,898,469 A | 4/1999 | Wang |
| 5,914,767 A | 6/1999 | Wedeck et al. |
| 5,929,963 A | 7/1999 | McNeal |
| 5,963,293 A | 10/1999 | Jannard |
| 5,969,789 A | 10/1999 | Houston et al. |
| 5,971,536 A | 10/1999 | Chiu |
| 5,987,702 A | 11/1999 | Simioni |
| 6,007,199 A | 12/1999 | Yang |
| 6,009,564 A | 1/2000 | Tackles et al. |
| 6,010,217 A | 1/2000 | Houston et al. |
| 6,047,410 A | 4/2000 | Dondero |
| 6,062,688 A | 5/2000 | Vinas |
| 6,086,199 A | 7/2000 | Holland et al. |
| 6,094,751 A | 8/2000 | Parks |
| 6,098,204 A | 8/2000 | Arnette |
| 6,105,177 A | 8/2000 | Paulson et al. |
| 6,106,116 A | 8/2000 | Houston et al. |
| 6,119,279 A | 9/2000 | Haslbeck |
| 6,131,246 A | 10/2000 | Paulson et al. |
| 6,168,271 B1 | 1/2001 | Houston et al. |
| 6,193,367 B1 | 2/2001 | Lee |
| 6,224,209 B1 | 5/2001 | Chen |
| 6,231,181 B1 | 5/2001 | Swab |
| 6,250,756 B1 | 6/2001 | Jannard |
| 6,273,564 B1 | 8/2001 | Wedeck et al. |
| 6,282,727 B1 | 9/2001 | Lindahl |
| 6,296,357 B1 | 10/2001 | Bof |
| 6,428,165 B1 | 8/2002 | Rivera |
| 6,464,353 B1 | 10/2002 | Spindelbalker |
| 6,477,717 B1 | 11/2002 | Winefordner et al. |
| 6,533,412 B1 | 3/2003 | Wang et al. |
| 6,540,351 B1 | 4/2003 | Meiler |
| 6,550,912 B2 | 4/2003 | Vitaloni |
| 6,561,647 B1 | 5/2003 | Chen |
| 6,564,804 B2 | 5/2003 | Salatka et al. |
| 6,575,570 B2 | 6/2003 | Mauri |
| 6,641,263 B2 | 11/2003 | Olney |
| 6,712,465 B1 | 3/2004 | Teng |
| 6,715,157 B2 | 4/2004 | Mage |
| 6,732,383 B2 | 5/2004 | Cleary et al. |
| 6,742,890 B1 | 6/2004 | Teng |
| 6,742,891 B2 | 6/2004 | Chen |
| 6,786,592 B2 | 9/2004 | Rivera |
| 6,804,835 B2 | 10/2004 | Chou |
| 6,834,951 B2 | 12/2004 | Xie |
| 6,857,738 B1 | 2/2005 | Bove et al. |
| 6,863,395 B1 | 3/2005 | Teng |
| 6,923,537 B2 | 8/2005 | Hartley et al. |
| 6,926,404 B2 | 8/2005 | Bassahon et al. |
| 6,929,364 B1 | 8/2005 | Jannard |
| 6,938,277 B2 | 9/2005 | Lindahl |
| 6,942,338 B2 | 9/2005 | Ku |
| 6,953,247 B1 | 10/2005 | Duffy et al. |
| 6,959,988 B1 | 11/2005 | Sheldon |
| 6,964,067 B1 | 11/2005 | Hartman |
| 6,964,477 B1 | 11/2005 | Teng |
| 6,994,434 B2 | 2/2006 | Blanchette et al. |
| 7,000,263 B2 | 2/2006 | McNeal |
| 7,058,991 B2 | 6/2006 | Hartman |
| 7,083,276 B2 | 8/2006 | Olney |
| 7,090,346 B2 | 8/2006 | Tsai |
| 7,137,426 B2 | 11/2006 | Neri et al. |
| 7,137,700 B2 | 11/2006 | DiChiara et al. |
| 7,150,525 B1 | 12/2006 | Yang |
| 7,163,289 B2 | 1/2007 | Wedeck et al. |
| 7,200,875 B2 | 4/2007 | Dondero |
| 7,204,589 B2 | 4/2007 | Pieterman |
| 7,219,992 B1 | 5/2007 | Wu |
| 7,219,993 B1 | 5/2007 | Chiou |
| 7,222,958 B1 | 5/2007 | Chiou |
| 7,222,959 B2 | 5/2007 | Jannard |
| 7,234,808 B2 | 6/2007 | Bruck |
| 7,241,007 B2 | 7/2007 | Cody |
| 7,261,410 B1 | 8/2007 | Chen |
| 7,267,737 B2 | 9/2007 | Neri et al. |
| 7,278,733 B2 | 10/2007 | Olney |
| 7,296,887 B1 | 11/2007 | Hsiung |
| 7,328,999 B2 | 2/2008 | Zelman |
| 7,347,545 B1 | 3/2008 | Jannard et al. |
| 7,390,086 B2 | 6/2008 | Lee |
| 7,396,124 B1 | 7/2008 | Wang |
| 7,425,065 B2 | 9/2008 | Wang |
| 7,452,069 B2 | 11/2008 | Lipawsky |
| 7,481,529 B1 | 1/2009 | Chen |
| 7,497,569 B2 | 3/2009 | Webb |
| 7,520,217 B2 | 4/2009 | Roberts et al. |
| 7,526,813 B2 | 5/2009 | Tominaga et al. |
| 7,553,013 B2 | 6/2009 | Tsai |
| 7,556,373 B2 | 7/2009 | VanAtta et al. |
| 7,563,341 B2 | 7/2009 | Ferguson et al. |
| 7,585,072 B1 | 9/2009 | Wang-Lee |
| 7,594,280 B2 | 9/2009 | Lindahl |
| 7,648,233 B2 | 1/2010 | Blanshay et al. |
| 7,658,492 B2 | 2/2010 | Siu |
| 7,681,257 B1 | 3/2010 | Broersma |
| 7,686,449 B2 | 3/2010 | Jannard et al. |
| 7,703,913 B2 | 4/2010 | Huang |

(56) References Cited

U.S. PATENT DOCUMENTS

| | | |
|---|---|---|
| 7,712,894 B2 | 5/2010 | Tsai |
| 7,712,896 B1 | 5/2010 | Lee |
| 7,725,959 B2 | 6/2010 | Wang-Lee |
| 7,771,043 B2 | 8/2010 | Welchel et al. |
| 7,810,174 B2 | 10/2010 | Matera |
| 7,850,301 B2 | 12/2010 | DiChiara |
| 7,856,673 B2 | 12/2010 | Reed |
| 7,887,181 B1 | 2/2011 | Chen |
| 7,954,942 B2 | 6/2011 | Calilung et al. |
| 8,192,015 B2 | 6/2012 | Taylor et al. |
| D675,666 S | 2/2013 | Thixton et al. |
| 2002/0039928 A1 | 4/2002 | Spurgeon et al. |
| 2003/0067584 A1 | 4/2003 | Mauri |
| 2004/0141146 A1 | 7/2004 | Blanchette et al. |
| 2004/0141147 A1 | 7/2004 | Cyr |
| 2004/0160570 A1 | 8/2004 | Polovin |
| 2005/0070434 A1 | 3/2005 | Drake |
| 2005/0132478 A1 | 6/2005 | Canavan |
| 2005/0270477 A1 | 12/2005 | Curci et al. |
| 2006/0119790 A1 | 6/2006 | Tsai |
| 2006/0179554 A1 | 8/2006 | Barton |
| 2006/0191062 A1 | 8/2006 | Matera |
| 2006/0250571 A1 | 11/2006 | Li |
| 2006/0256281 A1 | 11/2006 | Li |
| 2006/0283555 A1 | 12/2006 | Green |
| 2007/0024806 A1 | 2/2007 | Blanshay |
| 2007/0109490 A1 | 5/2007 | Collier et al. |
| 2007/0121059 A1 | 5/2007 | Chiou |
| 2007/0200997 A1 | 8/2007 | Jannard |
| 2007/0240812 A1 | 10/2007 | Bortolato |
| 2007/0261782 A1 | 11/2007 | Frye et al. |
| 2008/0036961 A1 | 2/2008 | Zhou |
| 2008/0072365 A1 | 3/2008 | Alberto |
| 2008/0137028 A1 | 6/2008 | Webb |
| 2008/0155736 A1 | 7/2008 | Paulson et al. |
| 2008/0198323 A1 | 8/2008 | Siu |
| 2008/0266515 A1 | 10/2008 | Hou |
| 2008/0301858 A1 | 12/2008 | Wang-Lee |
| 2008/0304005 A1 | 12/2008 | DiChiara |
| 2009/0015784 A1 | 1/2009 | Van Atta et al. |
| 2009/0019620 A1 | 1/2009 | Reed |
| 2009/0038059 A1 | 2/2009 | McNeal et al. |
| 2009/0217444 A1 | 9/2009 | Pan |
| 2009/0225271 A1 | 9/2009 | Radmard et al. |
| 2009/0300830 A1 | 12/2009 | Mage |
| 2009/0313746 A1 | 12/2009 | Wang |
| 2009/0323015 A1 | 12/2009 | Siu |
| 2010/0085533 A1 | 4/2010 | Calilung et al. |
| 2010/0201937 A1 | 8/2010 | Gardaz |
| 2010/0231850 A1 | 9/2010 | Hones |
| 2011/0007262 A1 | 1/2011 | Taylor et al. |
| 2011/0194065 A1 | 8/2011 | Belbey et al. |
| 2011/0225709 A1 | 9/2011 | Saylor et al. |
| 2011/0225710 A1 | 9/2011 | Reyes et al. |
| 2011/0225711 A1 | 9/2011 | Reyes et al. |
| 2011/0242479 A1 | 10/2011 | Radmard et al. |
| 2011/0299026 A1 | 12/2011 | Calilung et al. |
| 2012/0038879 A1 | 2/2012 | Reyes et al. |
| 2012/0218504 A1 | 8/2012 | Taylor et al. |
| 2012/0218507 A1 | 8/2012 | Calilung et al. |
| 2013/0077042 A1 | 3/2013 | Calilung et al. |

FOREIGN PATENT DOCUMENTS

| | | |
|---|---|---|
| EP | 0495767 | 7/1992 |
| EP | 1810648 | 7/2007 |
| EP | 1830221 | 9/2007 |
| FR | 1126329 | 11/1956 |
| FR | 2088866 | 1/1972 |
| FR | 2626683 | 8/1989 |
| FR | 2626682 | 12/1992 |
| FR | 2688322 | 12/1992 |
| FR | 2 800 173 | 4/2001 |
| GB | 512419 | 9/1939 |
| GB | 2199155 | 6/1988 |
| GB | 2278459 | 11/1994 |
| JP | 219021 | 2/1990 |
| JP | 07-64028 | 3/1995 |
| JP | 07-140423 | 6/1995 |
| JP | 2009-139921 | 6/2009 |
| JP | 2010-224130 | 10/2010 |
| WO | WO 94/29763 | 12/1994 |
| WO | WO 97/21135 | 6/1997 |
| WO | WO 98/30930 | 7/1998 |
| WO | WO 03/023495 | 3/2003 |
| WO | WO 2007/049070 | 5/2007 |
| WO | WO 2008/125743 | 10/2008 |
| WO | WO 2010/021419 | 2/2010 |
| WO | WO 2010/081043 | 7/2010 |

RELEASABLE EARSTEM MOUNTING MECHANISM FOR EYEWEAR

RELATED APPLICATIONS

This application claims the benefit of U.S. Provisional Application No. 61/565,943, filed on Dec. 1, 2011. The entire contents of the application identified above is incorporated by reference herein and made a part of this specification.

BACKGROUND

1. Field of the Inventions

The present inventions relate generally to mounting systems for eyewear, and more specifically to methods and apparatuses for mounting and retaining earstems relative to frames of an eyeglass.

2. Description of the Related Art

A wide variety of improvements have been made in recent years in the eyewear field, particularly with respect to eyewear intended for use in active sports or as fashion sunglasses. These eyewear designs provide a variety of functional improvements, such as maximizing interception of peripheral light, reducing optical distortion and increasing the wearer's comfort level, compared to previous active sport eyewear.

Nonetheless, there remains a need for a releasable earstem mounting mechanism for eyewear which provides secure pivotable attachment of an earstem or strap, and can be easily exchanged.

SUMMARY

Several advantageous features can be present in embodiments of eyewear, such as an eyeglass or goggle, that incorporates one or more of the features disclosed herein. While these features may be illustrated with regard to a dual lens eyeglass, these features can also be incorporated into unitary lens eyewear or into a goggle. Accordingly, the present discussion and embodiments are intended to illustrate features that can be applied to dual or unitary lens eyeglasses or goggles, although illustration and discussion will be shown for dual lens eyeglasses for the sake of brevity. Thus, goggle embodiments can be provided which include the advantageous features disclosed herein. As used herein, in accordance with the customary understanding in this art, the term "eyeglass" and similar terms include products with glass or non-glass lens that are corrective or non-corrective.

Further, a continuing objective in the field of high performance eyewear, particularly for eyewear which is intended for use in high-speed action sports or military applications, is ballistic resistance and lens stability. Various improvements have been made that enable a wearer to quickly modify eyewear using replaceable components and/or lenses, such by using the systems disclosed in U.S. Pat. Nos. 4,730,915, 5,387,949, and 7,347,545, the entirety of the disclosures of each of which is incorporated herein by reference. In some embodiments disclosed herein, additional support can be provided to a replaceable or removable lens in order to enhance the ballistic resistance and lens stability of an eyeglass or goggle. Some examples of support features are shown in Applicants' U.S. Patent Application Publication No. 2010/0085533, published on Apr. 8, 2010, now U.S. Pat. No. 7,954,942, issued on Jun. 7, 2011, the entirety of which is incorporated herein by reference. Further examples of support features are shown in Applicants' copending U.S. Patent Application Publication No. 2011/0007262, published on Jan. 13, 2011, U.S. application Ser. No. 13/020,747, filed on Feb. 3, 2011, U.S. application Ser. No. 13/051,913, filed on Mar. 18, 2011, and U.S. Application Ser. No. 61/538,068, filed on Sep. 22, 2011, the entireties of each of which are incorporated herein by reference.

In some embodiments, at least in part, a durable eyeglass or goggle design can enable an earstem to be secured to a frame of the eyeglass or goggle using one or more retention assemblies or devices. Further, the frame of the eyeglass or goggle can comprise corresponding engagement features that enable the earstem to be coupled to the frame.

Some embodiments can advantageously securely retain the earstem relative to the frame while allowing the earstem to be easily removed and replaced by the wearer. Further, the frame and earstem assembly can be coupled such that the eyeglass provides superior ballistic resistance, rigidity, and lens stability.

To achieve some of the above-noted benefits, some embodiments provide an eyeglass or goggle eyewear that can support at least one lens in a field of view of a wearer. The eyewear can comprise retention means for securing at least one earstem relative to the frame. The retention means can comprise one or more retention assemblies. The retention assembly can comprise a stationary or passive retention mechanism and/or a movable or active retention mechanism for securing the earstem relative to the frame.

Further, at least a portion of some embodiments of a retention assembly can be coupled to or formed with an anterior portion of an earstem. The retention assembly can permit the earstem to be rotatably mounted onto the frame. For example, an earstem can comprise one or more engagement portions that can be coupled to a portion of the frame. The engagement portion(s) of the earstem can have a shape that is generally complimentary to a corresponding retention mechanism(s), engagement structure(s), or restraining portion(s) of the frame so that the earstem and the frame can closely fit together. In some embodiments the earstem and the frame can be rotatably coupled together. For example, the engagement portion(s) of the earstem can comprise a recess, protrusion, aperture, detent, or other engageable structure. The retention mechanism(s), engagement structure(s), or restraining portion(s) of the frame can engage the engagement portion(s) of the earstem for securing the earstem relative to the frame.

In some embodiments, the retention assembly can also comprise a latch component that can be carried by the earstem and be actuated to secure the earstem relative to the frame. For example, the latch component can be rotatably mounted on the earstem. The latch component can be pivotally actuated between engaged and disengaged positions in which the latch component allows the earstem to be secured to or disengaged from the frame.

In some embodiments, the retention assembly can comprise one or more engagement portions along the anterior portion of the earstem and one or more latch components. The retention assembly can be configured such that a latch component is pivotally mounted on the earstem and cooperates with the engagement portion of the earstem to engage with a portion of the frame. For example, the engagement portion of the earstem can be coupled to a hinge pin of the frame and the latch component can be pivoted into an engaged position to cooperatively engage with the hinge pin and secure the earstem relative to the frame.

For example, the engagement portion of the earstem and the latch component of the retention assembly can cooperatively restrain one or more degrees of freedom of movement of the frame (e.g. hinge pin) relative to the earstem. In some embodiments, the retention assembly can restrain all relative movement between the earstem and frame except rotational movement. In some embodiments, the latch component and the engagement portion of the earstem can cooperatively engage with the hinge pin such that a circumference of the hinge pin is enclosed by the latch component and the engagement portion of the earstem. For example, the engagement portion of the earstem can be configured as a slot into which the hinge pin is received, and the latch component can be pivoted into an engaged position in which an opening of the slot is closed off, whereby the hinge pin is enclosed within the slot.

BRIEF DESCRIPTION OF THE DRAWINGS

Various features of illustrative embodiments of the inventions are described below with reference to the drawings. The illustrated embodiments are intended to illustrate, but not to limit, the inventions. The drawings contain the following figures.

DETAILED DESCRIPTION

Figure 1:
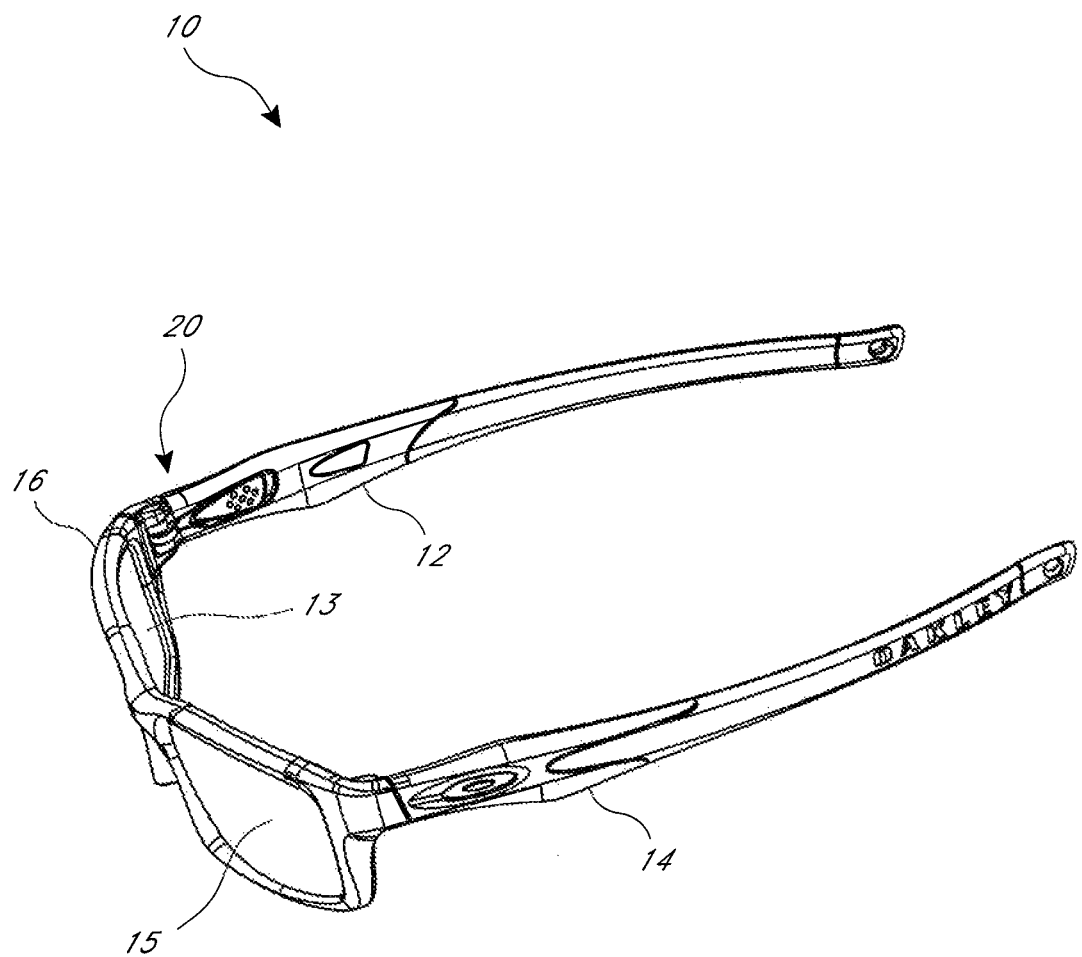
FIG. 1 is a perspective view of an eyeglass in accordance with an embodiment of the present inventions.

While the present description sets forth specific details of various embodiments, it will be appreciated that the description is illustrative only and should not be construed in any way as limiting. Additionally, although particular embodiments of the present inventions may be disclosed or shown in the context of unitary or dual lens eyewear systems, such embodiments can be used in both unitary and dual lens eyewear systems. Further, although embodiments disclosed herein can be used with eyeglasses, such embodiments can also be used with goggles. Embodiments are illustrated and discussed generally with respect to dual lens eyeglasses for sake of brevity, though such embodiments can be used with unitary or dual lens eyeglasses or goggles.

Further, although particular embodiments may be disclosed or shown in the context of frame-based eyewear (eyeglasses or goggles) having a dual lens with full or partial orbitals, such embodiments can be used with frameless unitary lens eyewear. Further, although the mounting mechanisms or retention assemblies disclosed herein are shown as attaching an earstem to a frame, some embodiments can be used to attach an earstem directly to a lens. Further, some embodiments of these mechanisms or assemblies can be used to interconnect one or more components of the eyewear, such as lens(es), earstems, frames, and other components. Thus, retention components and structures in accordance with embodiments disclosed herein can also be utilized to interconnect one or more components of the eyewear, such as earstems and/or frame components of the eyewear. The retention assemblies embodiments may comprise components that can be utilized either as the primary connector or as a secondary connector for cooperation with another portion of the retention assembly. Furthermore, various applications of such embodiments and modifications thereto are also encompassed by the general concepts described herein.

Additionally, some embodiments disclosed herein provide a releasable connector that comprises two or more components of a first mechanism that are relatively moveable in order to capture or engage with a portion of a second mechanism. For example, two or more components having semicircular, concave, and/or indented surfaces can be removably positionable to form at least a portion of an aperture or opening configured to receive or support a portion of another component. The aperture or opening can be completely enclosed, although in some embodiments, the aperture or opening can have a gap or slit between the two or more components. In some embodiments, the two or more components can move from a disengaged position to an engaged position in which surfaces of the two or more components mate and/or collectively form an engagement section that can engage and/or support a portion of another component. The engagement and/or support of the other component can provide a stationary or fixed engagement or a pivoting, slidable, or otherwise moveable engagement between the two or more components and the other component.

FIGS. 1-9 illustrate an embodiment of the present inventions. FIG. 1 illustrates a front perspective view of an embodiment in which an eyeglass 10 comprises a pair of earstems 12, 14 that are attached to a frame 16 of the eyeglass 10. As illustrated, the frame 16 can be configured to accommodate a first lens 13 and a second lens 15 of a dual lens system. The eyeglass 10 can comprise a retention assembly 20. In the illustrated embodiment, the retention assembly 20 can be used to releasably, pivotably attach the earstem 12 to the frame 16. Further, the eyeglass 10 can also comprise another retention assembly that can be used to releasably, pivotably attach the earstem 14 to the frame 16 (not shown, but which can be a mirror image of the retention assembly 20).

Figure 2:
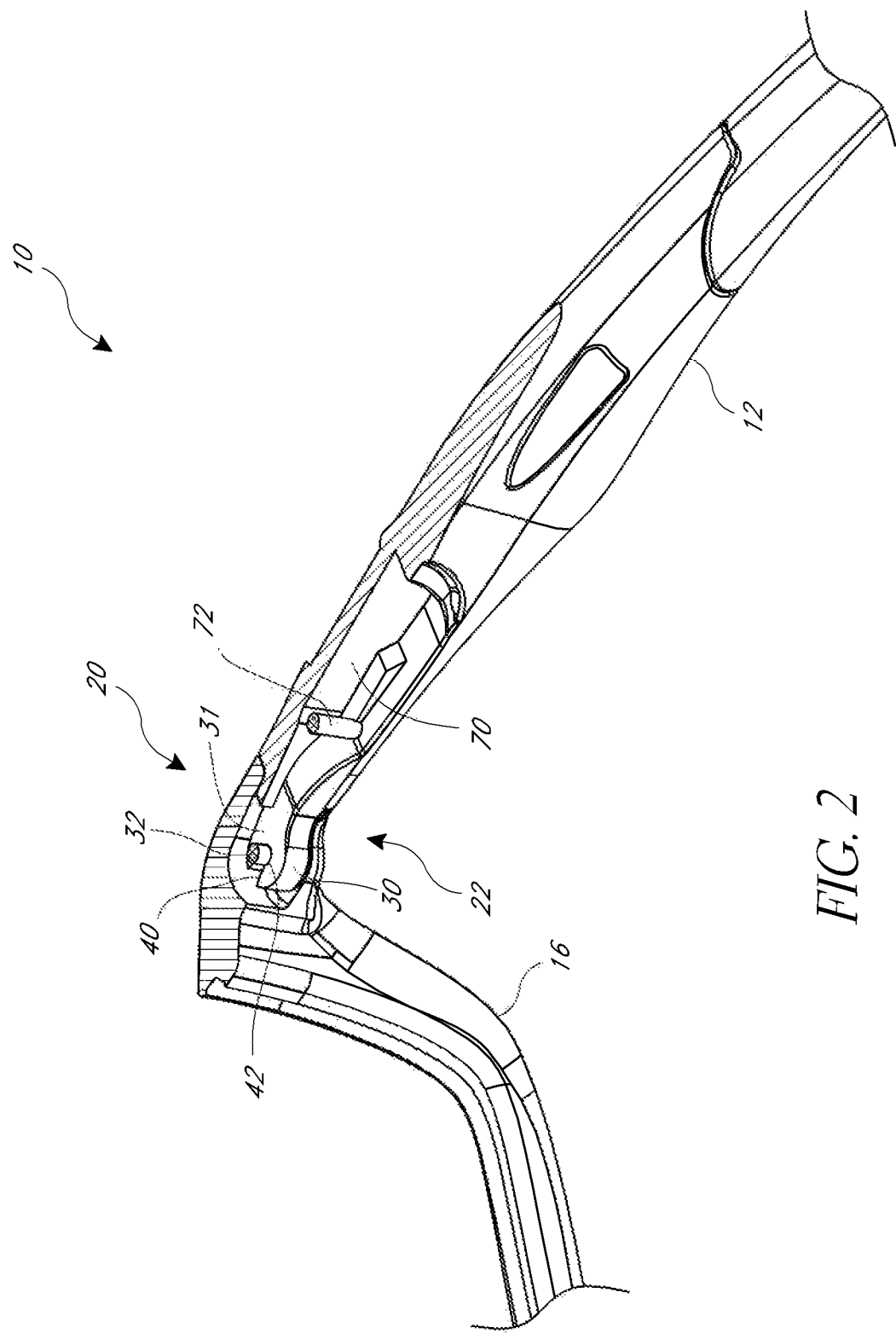
FIG. 2 is a rear perspective cross-sectional view of the eyeglass of FIG. 1, illustrating portions of a retention assembly.

FIG. 2 is a rear perspective view of the eyeglass 10 in which a portion of a retention assembly 20 is shown. In this embodiment, the retention assembly 20 can be integrated into an anterior end 22 of the earstem 12. The anterior end 22 can comprise one or more cavities, apertures, protrusions, or detents that are configured to be coupled with, support and/or receive a complementary portion of the frame 16. The coupling between the earstem 12 and the frame 16 can be a rigid or stationary coupling or a pivoting (in one or multiple planes), sliding, or other type of movable coupling.

The frame 16 (or the lenses 13 and 15 in a frameless or partial frame dual lens embodiment, or a single lens in a frameless or partial frame unitary lens embodiment) can also comprise one or more engagement structures configured to be engaged with a portion of the earstem 12. The engagement structures of the frame 16 can be formed along lateral end portions thereof. For example, the engagement structures of the frame can comprise one or more hinge pins, recesses, protrusions, detents, apertures, or other engagement structures that can be coupled with the anterior end 22 of the earstem 12 to produce an interference fit.

Figure 3:
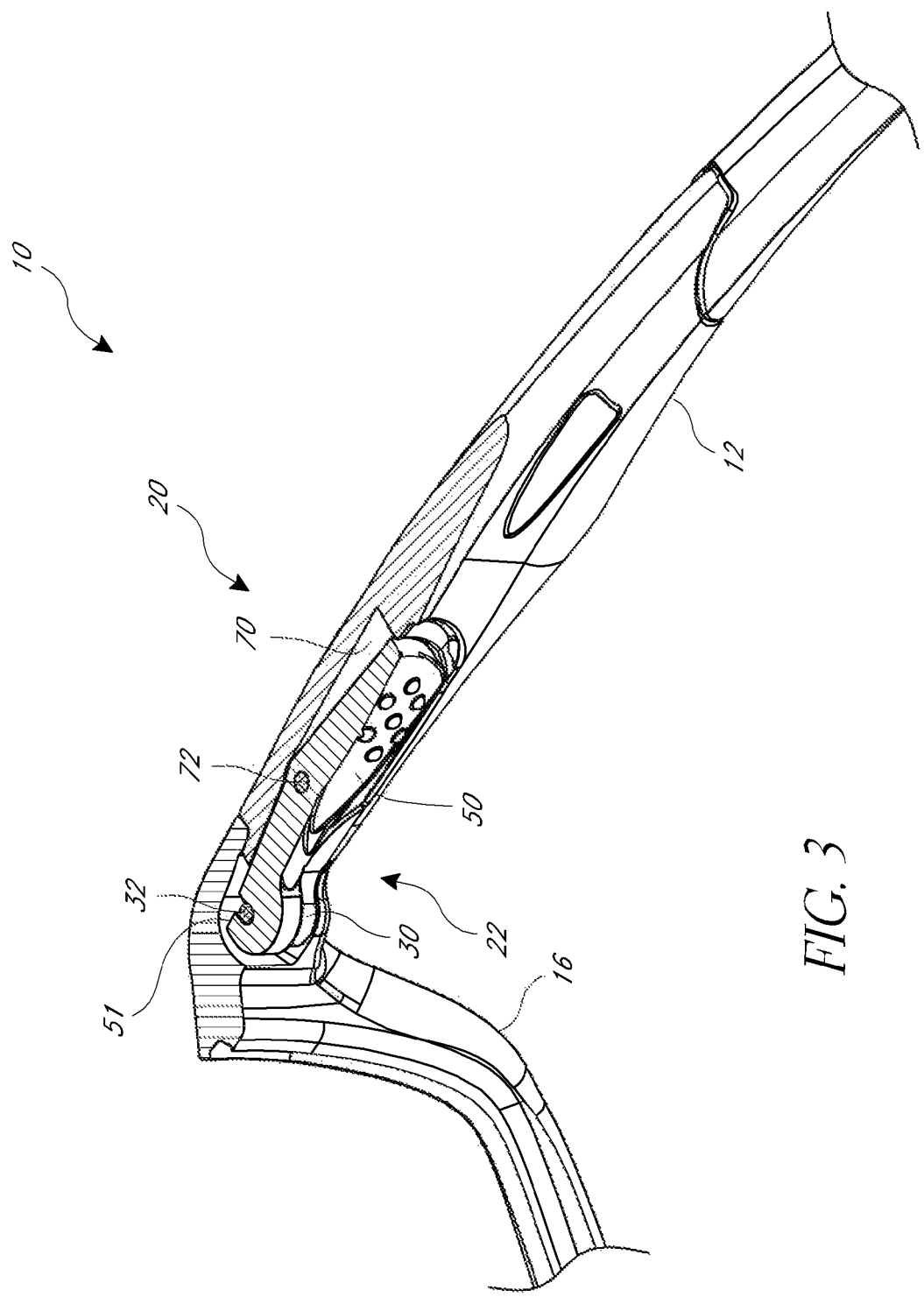
FIG. 3 is a rear perspective cross-sectional view of the eyeglass of FIG. 1, illustrating portions of the retention assembly.

For example, as shown in FIGS. 2 and 3, the anterior end 22 of the earstem 12 can comprise one or more prongs 30 extending from the anterior end 22 of the earstem 12. The prong 30 can be configured to attach to a portion of the frame 16, such as a lateral end or hinge pin 32. A first prong 30 and a second prong 31 can comprise a slot or open end 40 there between into which the hinge pin 32 of the frame 16 can be placed. The slot 40 formed between the prong 30 and prong 31 can define a straight, constant width passageway. However, as illustrated, the slot 40 can comprise a narrower width at the anterior end, leading to a greater width posteriorly, configured such that the hinge pin 32 must be urged through the narrowing 42 such as by plastic deformation that enable the slot 40 to provide a snap fit around the hinge pin 32. Thus, the engagement between the prongs 30 and 31 and the hinge pin 32 can provide a coupling between the earstem 12 and the frame 16. In some embodiments, the prongs 30 and 31 can be configured to form a rotational coupling with the hinge pin 32 of the frame 16, thereby allowing the earstem 12 to pivot relative to the frame 16.

As illustrated in FIG. 3, the retention assembly 20 can also comprise one or more latch components 50. FIG. 2 (showing the retention assembly 20 without a latch component) illustrates that the prong 30 of the anterior end 22 of the earstem 12 can restrict several degrees of freedom of movement of the earstem 12 relative to the frame 16 when coupled with the hinge pin 32. However, in order to further secure the earstem 12 relative to the frame 16 (should the prong 30 be insufficient to maintain engagement between the earstem 12 and the hinge pin 32), the retention assembly 20 can utilize the latch component 50 to restrict one or more further degrees of movement between the earstem 12 and the frame 16.

For example, as shown in FIG. 3, a locking surface 51 on the latch component 50 can be engaged with the hinge pin 32 to prevent the hinge pin 32 from exiting the slot 40 of the prong 30. Thus, in the illustrated embodiment, the earstem 12 can rotate about the hinge pin 32 (and relative to the frame 16), however, the retention assembly 20 (the prong 30 and the latch component 50) can prevent separation between the hinge pin 32 and the earstem 12.

As also illustrated in FIGS. 2 and 3, the earstem 12 can comprise one or more cavities, apertures, protrusions, or detents that are configured to receive and/or support the latch component 50. In the illustrated embodiment, the latch component 50 is pivotally supported within a cavity 70 of the earstem 12 using a pivot pin 72. Thus, the latch component 50 can be pivoted between engaged (shown in FIG. 3) and disengaged positions to engage with or release the hinge pin 32.

Figure 4:
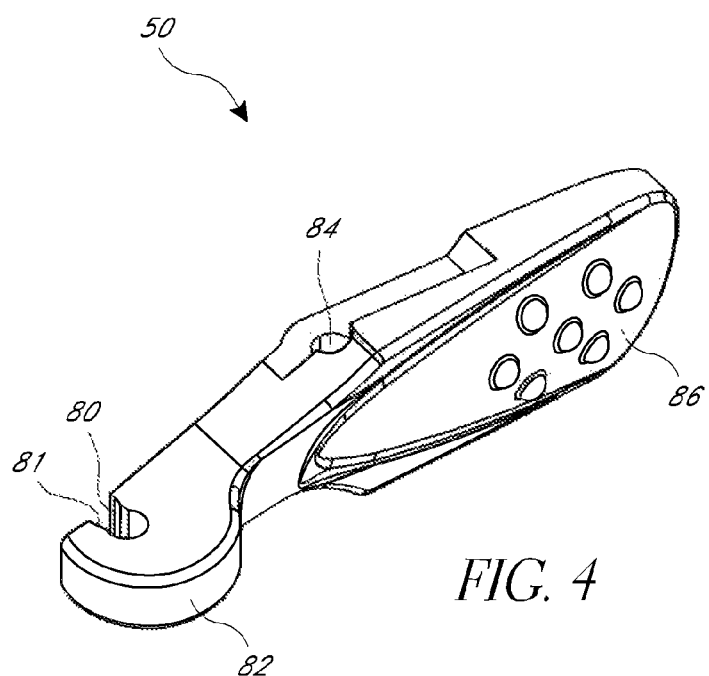
FIG. 4 is a front elevational view of a latch component of a retention assembly, according to an embodiment.
Figure 5:
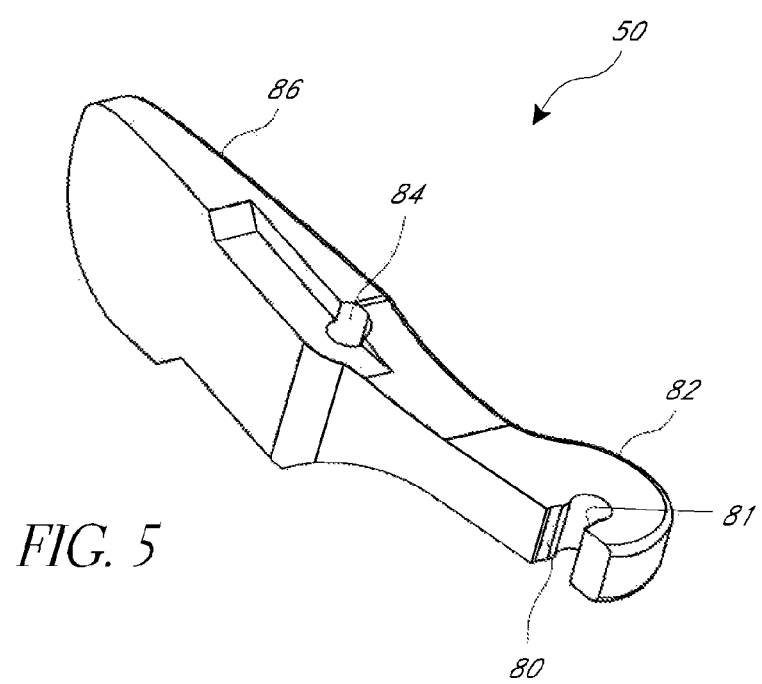
FIG. 5 is a rear elevational view of the latch component shown in FIG. 4.

FIGS. 4 and 5 illustrate an embodiment of the latch component 50. As shown, the latch component 50 comprises a hook portion 80 formed adjacent a head tab 82 thereof, a pivot aperture 84, and an actuation tab 86. The hook portion 80 is provided with a locking surface 81 configured to reversibly advance across the anterior portion of the slot 40 to entrap the hinge pin 32, as shown in FIG. 3. Similar to the slot 40, the hook portion 80 can comprise a slot having a narrow opening or one or more teeth or deflectable stops that enable a snap fit between the hook portion 80 and the hinge pin 32. Thus, in some embodiments, the hook portion 80 can be configured to provide a snap-fit engagement with the hinge pin 32. The pivot aperture 84 is configured to receive the pivot pin 72 of the earstem 12. Alternatively, the latch component 50 may comprise at least one post to be received in a complementary aperture of the earstem.

Figure 6:
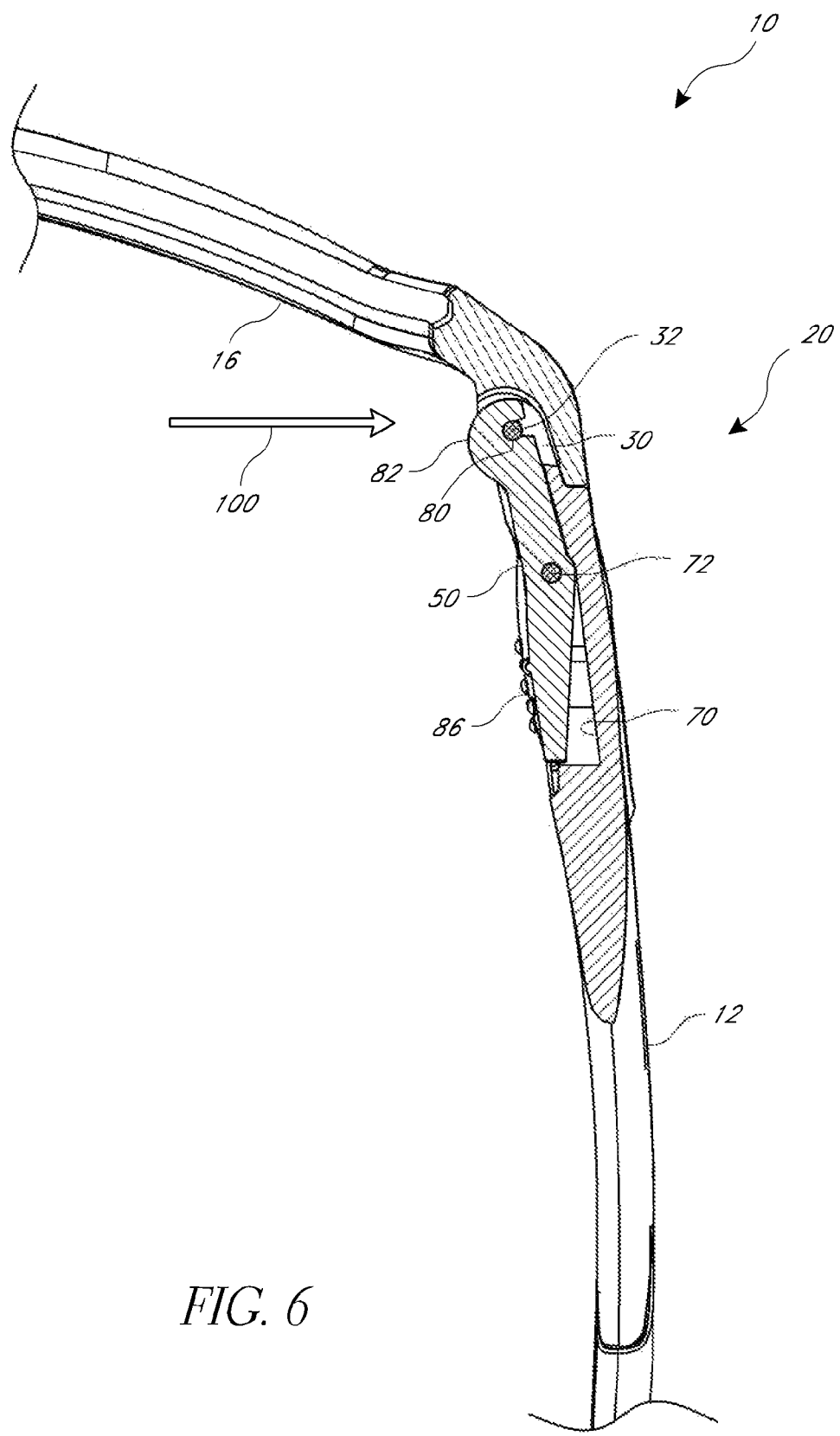
FIG. 6 is a top cross-sectional view of the retention assembly shown in FIG. 3, wherein the latch component is in an engaged position, in accordance with an embodiment.
Figure 7:
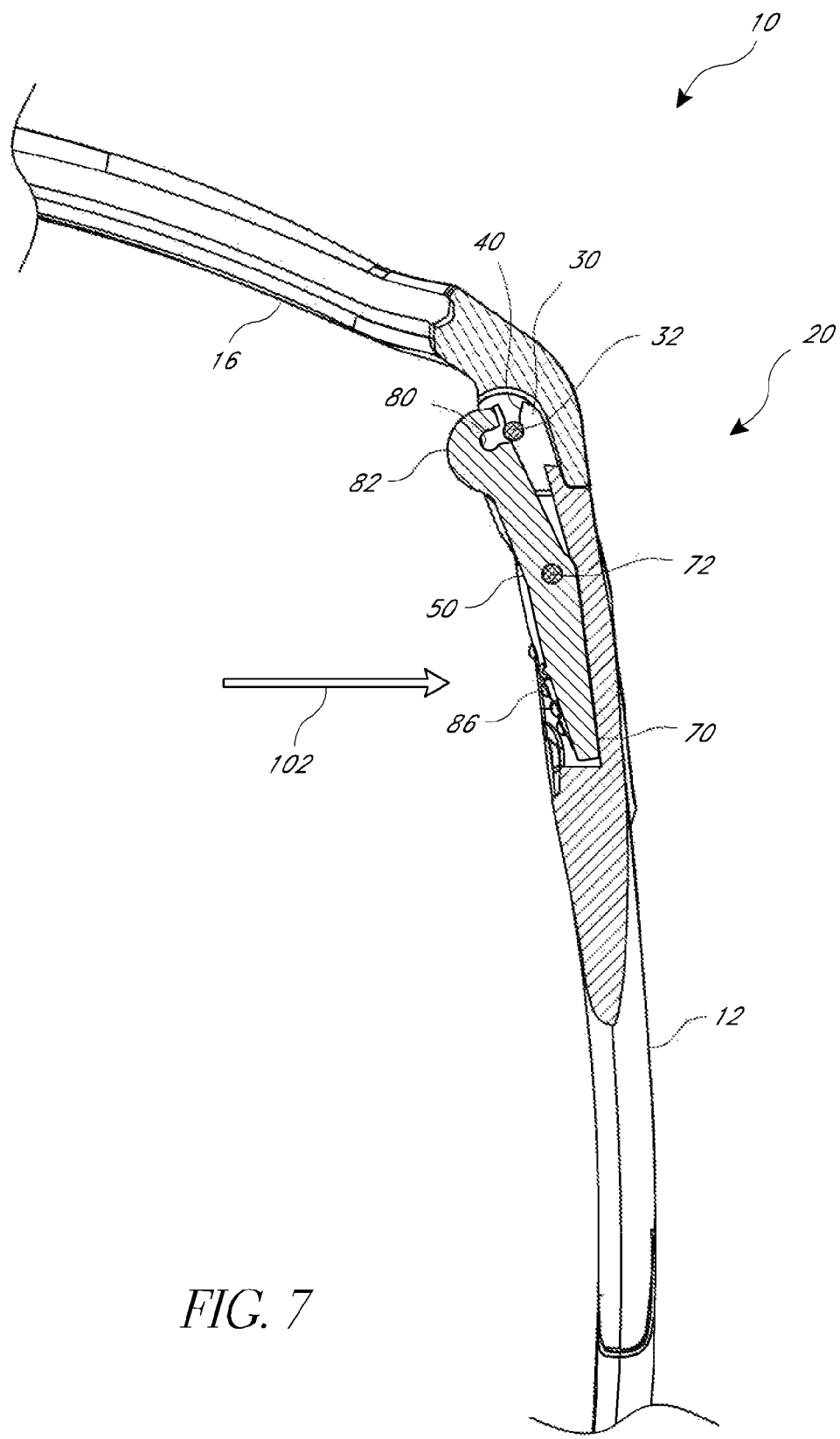
FIG. 7 is a top cross-sectional view of the retention assembly shown in FIG. 3, wherein the latch component is in a disengaged position, in accordance with an embodiment.

In order to rotate the latch component 50 to the engaged position, the user can press against a first surface such as on the head tab 82 of the latch component 50. In order to rotate the latch component 50 to the disengaged position, the user can press against a second surface such as on the tab 86 of the latch component 50. Depressing the tab 86 urges and rotates the tab 86 or body of the latch component 50 into the cavity 70 and disengages the hook component 80 from the hinge pin 32, thereby allowing the prong 30 to be removed posteriorly from the hinge pin 32 and the earstem to be separated from the frame 16. FIGS. 6 and 7 illustrate top cross-sectional views of the engaged and positions of the latch component 50, as explained above.

In the illustrated embodiment, depression of tab 86 in a lateral direction pivots the latch component 50 about pivot pin 72, to advance the locking surface 81 in a medial direction, enabling the earstem to be pulled posteriorly relative to pin 32, via slot 40. See FIG. 7. To secure the earstem into pivotable attachment to the frame, the earstem is advanced anteriorly to position the pin 32 in a seated orientation with respect to slot 40. Referring to FIG. 6, lateral displacement of the head tab 82 advances the locking surface 81 across the escape path for pin 32, thereby securing the earstem with respect to the eyewear.

Figure 8:
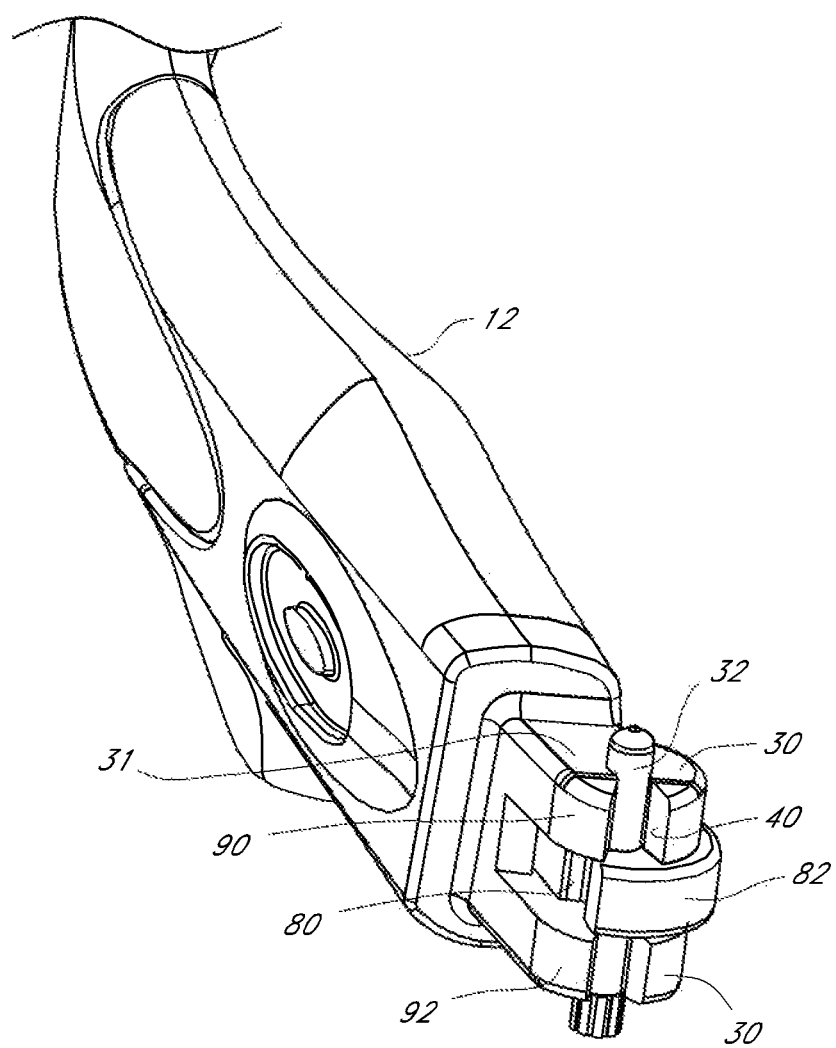
FIG. 8 is a front perspective view of the retention assembly of the eyeglass shown in FIG. 1, wherein a hinge pin of the frame is shown with the retention assembly being in the engaged position, in accordance with an embodiment.
Figure 9:
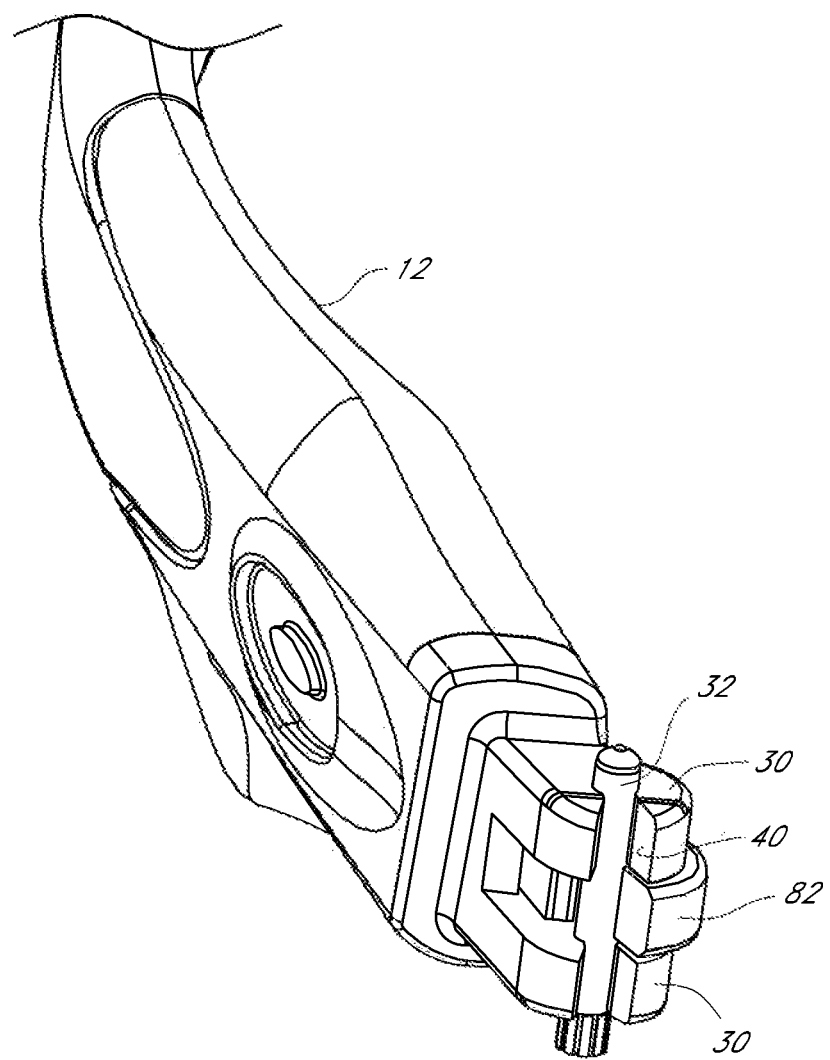
FIG. 9 is a front perspective view of the retention assembly of the eyeglass shown in FIG. 1, wherein a hinge pin of the frame is shown with the retention assembly being in the disengaged position, in accordance with an embodiment.

FIGS. 8 and 9 illustrate how the slot 40 of the prong(s) 30 and hook portion 80 interact to allow the hinge pin 32 to be received and engaged by the retention assembly 20 or removed from engagement therewith. As illustrated, the prong(s) 30 can be configured to comprise upper and lower C-shaped prongs 90, 92 configured to provide a snap-fit engagement with the hinge pin 32 via an axially facing opening. However, the prong(s) 30 can comprise a single C-shaped prong. Further, as illustrated, the hook portion 80 can comprise a single C-shaped hook portion with an opening facing laterally with respect to the longitudinal axis of the earstem. However, the hook portion 80 can comprise upper and lower C-shaped hooks. For example, upper and lower hook portions can be positioned above and below a single prong and moveable relative thereto. Moreover, a single hook portion can be paired with a single prong (either above or below) and moveable relative thereto for engaging with the hinge pin 32.

Some embodiments can be configured such that the earstem 12 is rotatably mounted relative to the frame 16. Thus, the retention assembly 20 can be coupled to a single portion of the frame 16, such as the hinge pin 32, to allow rotatable movement. However, some embodiments may provide a fixed or stationary engagement between the earstem 12 and the frame 16. Accordingly, in such embodiments, the retention assembly 20 can be coupled to one or more portions of the frame 16, which configuration may not otherwise permit rotational movement of the earstem 12 relative to the frame 16.

In some embodiments, the latch component 50 can be biased toward the engaged or closed position. For example, the retention mechanism 20 can comprise a spring or other resilient mechanism that imparts a rotational bias against the latch component 50. In some embodiments, the resilient mechanism can provide a biasing force about the pivot pin 72 or in the cavity behind the actuation tab 86 to force the hook portion 80 against the hinge pin 32, for example.

In the illustrated embodiment, the user can exert a force in a lateral direction (as shown by arrow 100 in FIG. 6) to cause the latch component 50 to engage with the hinge pin 32. Alternatively, the user can exert a force in a lateral direction (as shown by arrow 102 in FIG. 7) to cause the latch component 50 to disengage from the hinge pin 32. The configuration of the latch component 50 (being disposed on an interior of the earstem 12) allows the latch component 50 to be hidden from view and enables the forces to be directed in an outward, lateral direction. However, the configuration of the latch component 50 and the cavity 70 can be reversed (mirrored to be on the exterior of the earstem 12) and the latch component can be positioned to be actuated by using forces exerted in a medial direction. In such an embodiment, the actuation forces for the latch component could be applied in only a medial direction.

Figure 10:
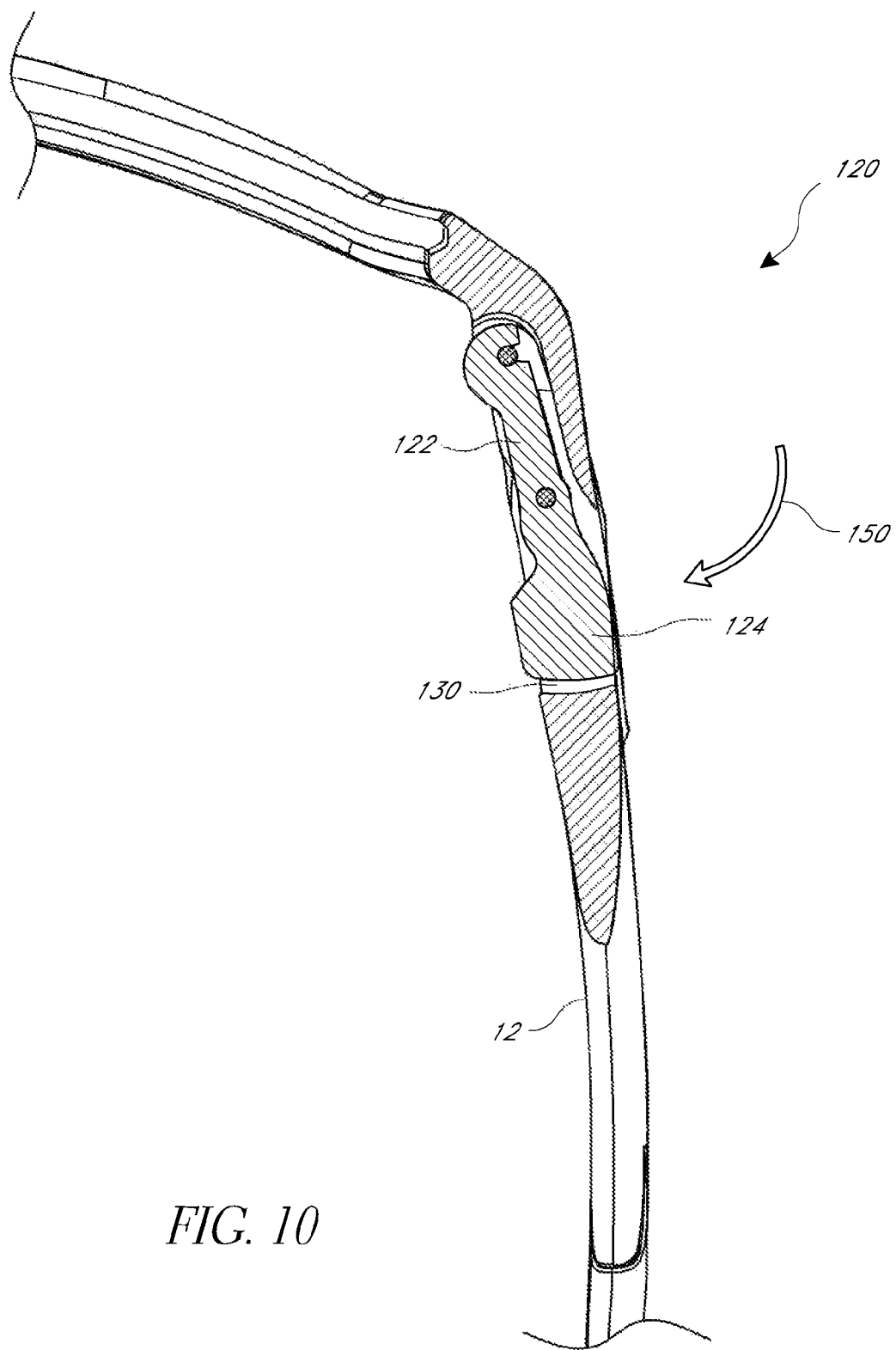
FIG. 10 is a top cross-sectional view of a retention assembly in accordance with another embodiment, wherein the latch component is in an engaged position.
Figure 11:
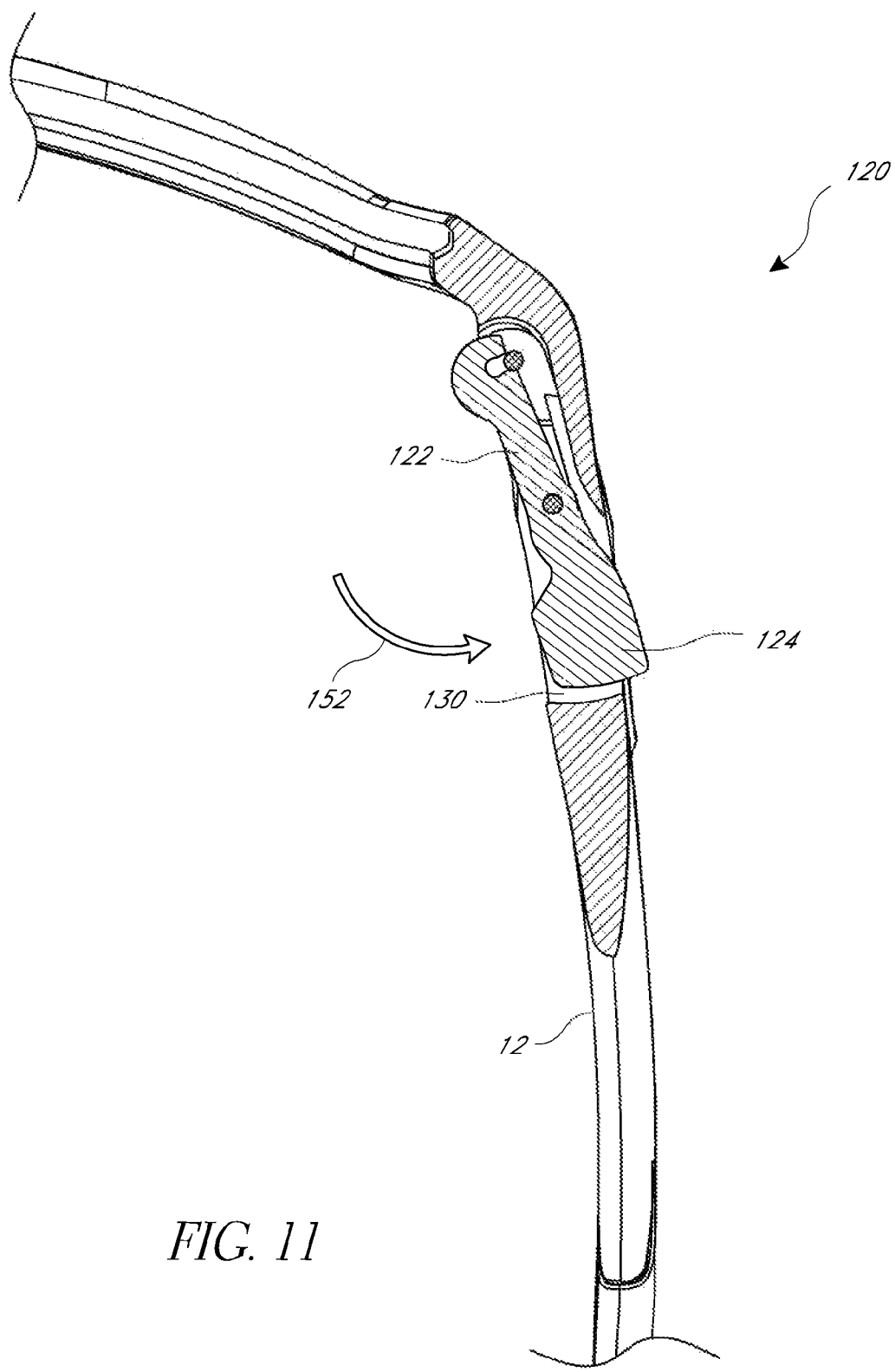
FIG. 11 is a top cross-sectional view of the retention assembly shown in FIG. 10, wherein the latch component is in a disengaged position.

However, as shown in FIGS. 10 and 11, in another embodiment of a retention mechanism 120, a latch component 122 and a cavity 130 of the earstem 12, are configured such that the latch component 122 is pivotably mounted and an actuation tab or posterior end 124 of the latch component 122 extends at least partially through the earstem 12 to expose the actuation tab or posterior end 124 on the lateral side of the earstem. In this embodiment, medial advance (arrow 150, FIG. 10) on the actuation surface locks the earstem to the frame. Lateral advance (arrow 152, FIG. 11) on the posterior end 154 disengages the earstem from the frame. As in other embodiments, the latch component 122 can also be biased using a spring or other resilient mechanism.

Figure 12:
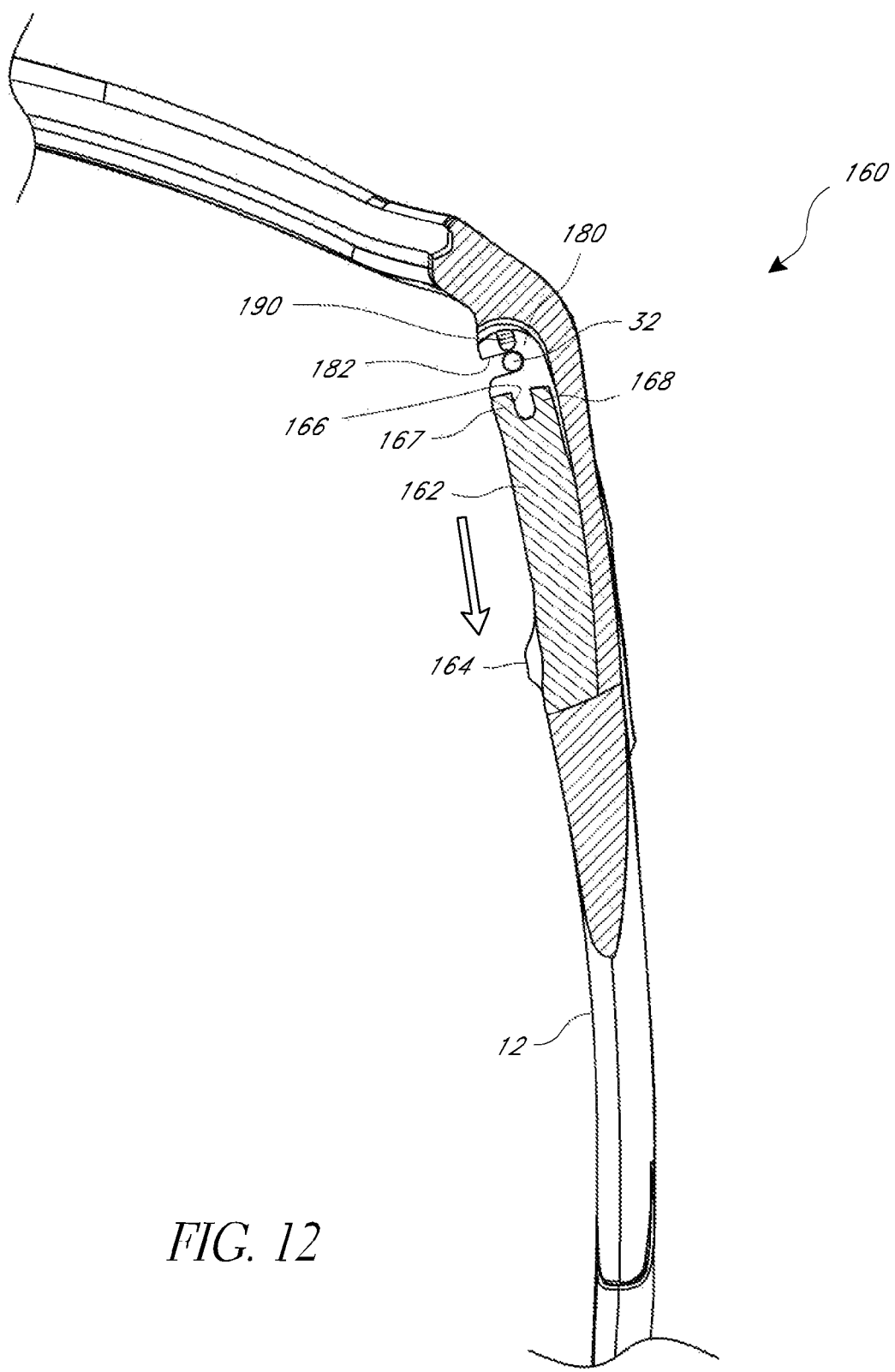
FIG. 12 is a top cross-sectional view of a retention assembly in accordance with yet another embodiment, wherein the latch component is in a disengaged position.
Figure 13:
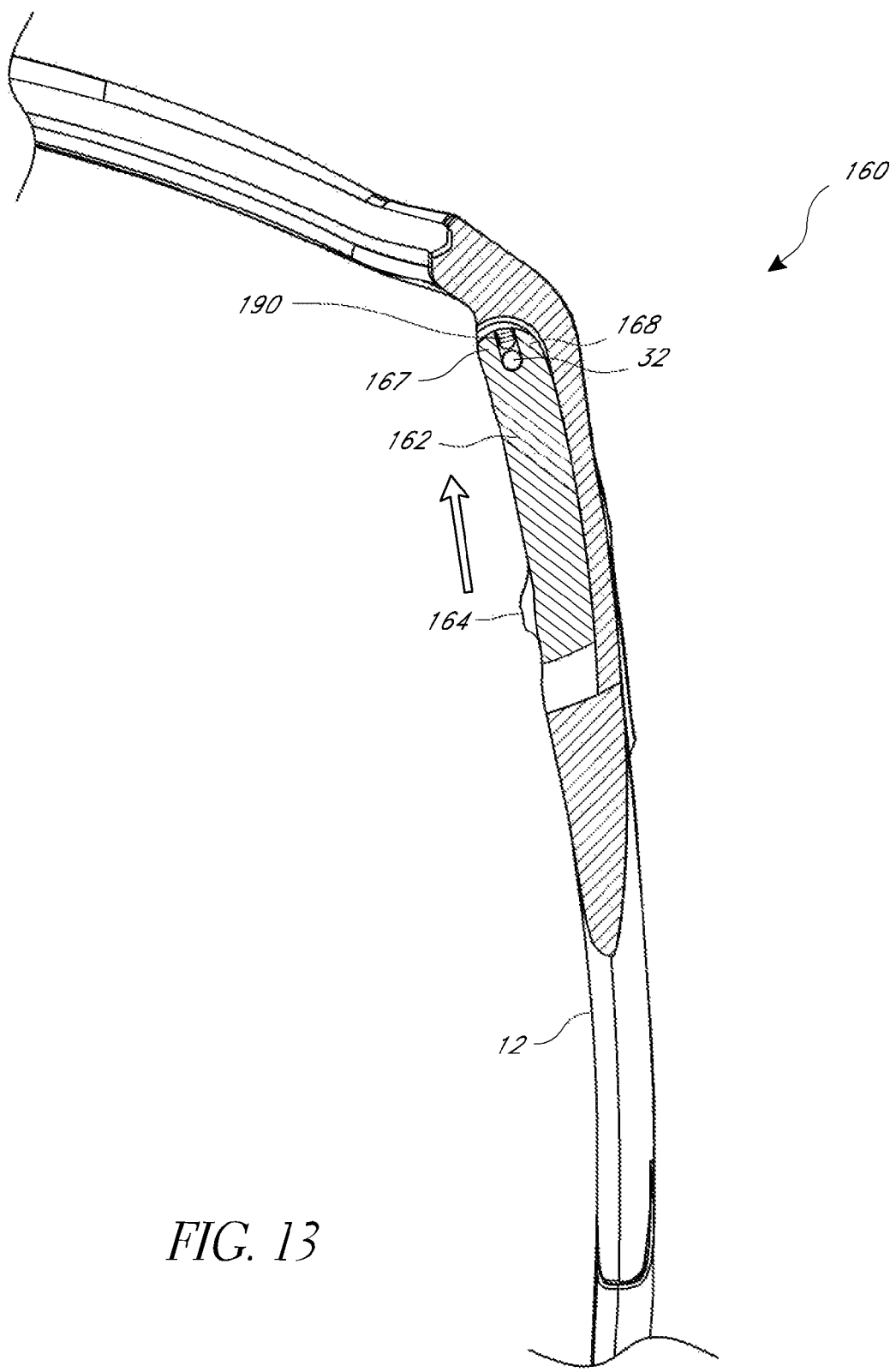
FIG. 13 is a top cross-sectional view of the retention assembly shown in FIG. 12, wherein the latch component is in an engaged position.

FIGS. 12 and 13 illustrate another embodiment of a retention mechanism 160, a latch component 162 and a cavity 170 of the earstem 12, which can be configured such that the latch component 162 is slidably mounted relative to the earstem 12. The latch component 162 can comprise an actuation tab or posterior end 164 of the latch component 122 which can allow the user to move the latch component 162 between disengaged and engaged positions (see FIGS. 12 and 13, respectively). In such an embodiment, the latch component 162 can comprise a slot 166 which opens in an anterior direction. Further, the anterior end of the earstem 12 can comprise at least one prong 180 having a slot 182 which opens in a medial or lateral direction. The slots 166 and 182 can be configured at a transverse orientation to each other as the other slot or hook portions 40, 82 discussed above, and the structural discussion of which is incorporated herein and not repeated for brevity.

Additionally, the latch component 162 can use only a single or inner prong or cover 167 that extends across the slot 182 of the prong 180. However, if the latch component 162 uses a rear or side prong 168, the prong 180 can also comprise a protrusion or raised portion 190 that can be positioned between the side prong 168 and the inner prong 167. The raised portion 190 can increase the durability and strength of the engagement between the hinge pin 32 and the anterior end of the earstem 12 or prong by tending to resist medial/lateral motion of the latch component 162 should a medial or lateral force be exerted against the earstem 12 that could cause the pin 32 to move medially out of the slot 182.

Figure 14:
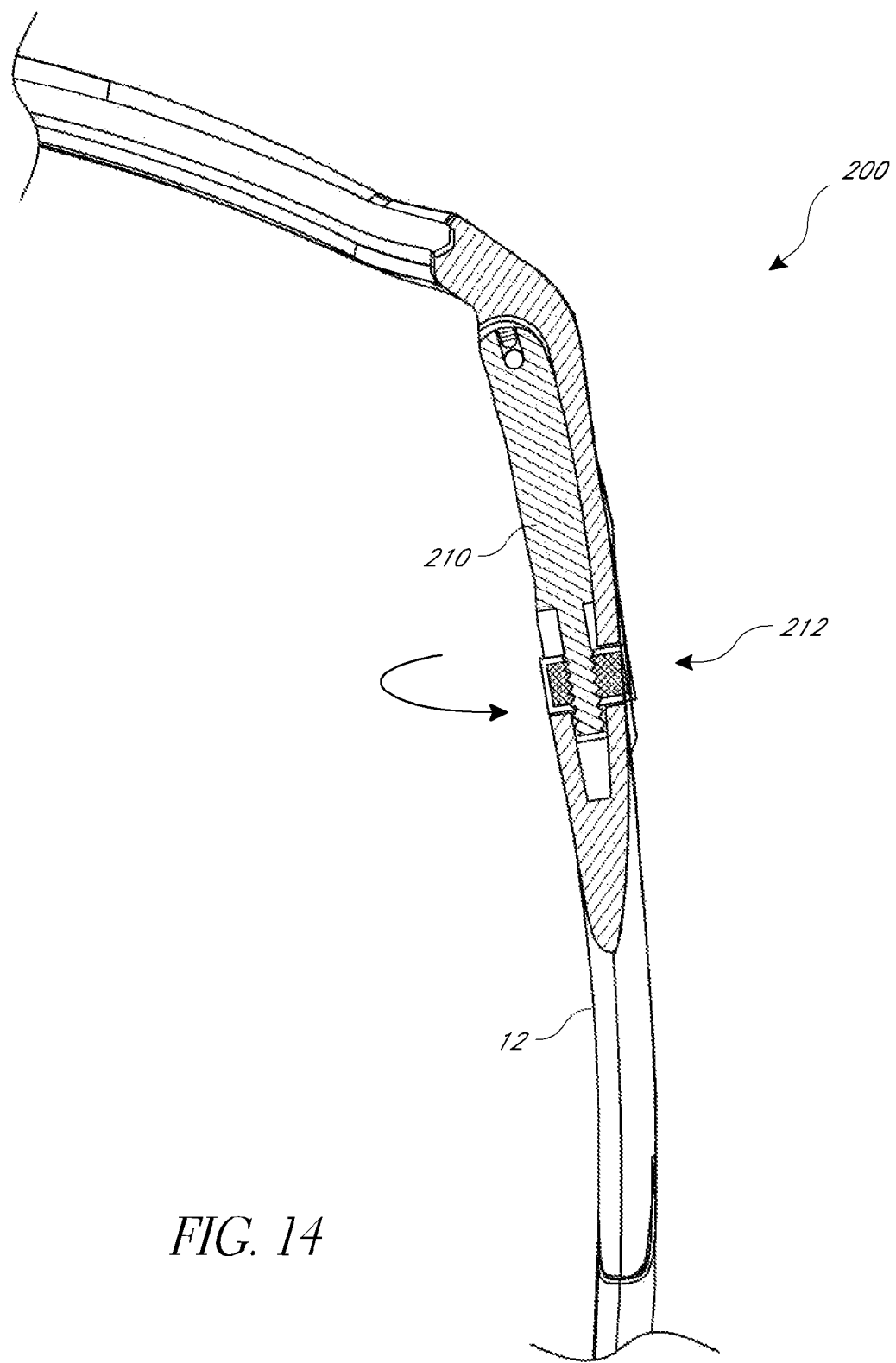
FIG. 14 is a top cross-sectional view of a retention assembly in accordance with yet another embodiment, wherein the latch component is in an engaged position.

In accordance with another embodiment, the latch component 162 can also be biased using a resilient mechanism or spring-loaded component. However, shown in FIG. 14, in another embodiment, a retention assembly 200 can be configured such that a latch component 210 can be actuated using a screw drive mechanism 212, such as a worm gear. Thus, the latch component 210 can be moved between engaged and disengaged positions in a sliding manner using rotation of a component that can be embedded or coupled with the earstem.

Eyewear in accordance with the present invention thus enables the user to readily interchange earstems with replacement earstems, such as to repair breakage, change the functionality or change the aesthetic appearance of the eyewear. For example, kits may be provided having a frame, and at least a first pair of earstems. Optionally, at least a second pair or a third pair or a fourth pair of earstems may also be provided. Each successive pair of earstems may differ aesthetically from each previous pair, such as by different color, physical configuration or by functional characteristics such as by including one or more of on-board power supplies, video and/or audio storage and/or display units, radio frequency transmitter, receiver, speakers and related controls. The wearer may release a first pair of earstems from the frame, couple a second, different pair of earstems to the frame, and actuate the locking mechanisms disclosed herein to pivotably secure the second set of earstems to the frame until subsequent change is desired.

In some embodiments, the retention assembly can provide excellent ballistic resistance for the frame and the earstems of the eyewear. The retention assembly can be integrated into, carried, or supported by the frame and/or earstems of the eyeglass. Thus, although the embodiments discussed above refer to a retention assembly that is carried on or supported by an earstem, the retention assembly can be at least partially or fully carried on or supported by the frame. Accordingly, in embodiments wherein the retention assembly is carried on or supported by the frame, a hinge pin or connecting structure can be carried on or supported by the anterior portion of the earstem. One or more components of the retention assembly can also be formed as a separate part that can be fitted and separated from embodiments disclosed herein.

Furthermore, in some embodiments that comprise a unitary lens, the lens can be engaged and/or supported at both lateral sides. For example, a unitary lens may be secured to a first retention assembly (first earstem) on the left side of midline and a second retention assembly (second earstem) on the right side of midline. The retention assemblies can include any of the passive or active retention mechanisms disclosed herein. The first retention assembly may be positioned on a point that is within the left lateral one third of the length of the lens, and attached to a portion or structure of the lens or a portion or structure that is coupled to the lens. The second retention assembly may be positioned on a point that is within the right lateral one third of the lens, and attached to a portion or structure of the lens or a portion or structure that is coupled to the lens. Typically, the retention assemblies can be symmetrically spaced apart along the length of the lens, or as a mirror image across the plane of symmetry (anatomical midline).

Although embodiments of these inventions have been disclosed in the context of certain examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions.

What is claimed is:

1. Eyewear comprising:
a frame;
at least one earstem having an anterior end and a posterior end; and
a retention assembly comprising at least one prong extending from the anterior end of the earstem and a latch component being moveably coupled to the earstem, the at least one prong comprising a slot which extends in a first direction for receiving an engagement structure of the frame, the latch component comprising a slot which extends in a second direction configured to overlap at least partially with the slot of the at least one prong such that the engagement structure of the frame is captured in the slots when the latch component is positioned in an engaged position, wherein the latch component restricts movement of the engagement structure out of the slot of the at least one prong of the earstem,
wherein, when the latch component is in the engaged position, the second direction is nonparallel to the first direction.

2. The eyewear of claim 1, wherein the engagement structure comprises one of a hinge pin, recess, protrusion, detent, and aperture.

3. The eyewear of claim 1, wherein the retention assembly comprises a first prong and a second prong and the slot is formed between the first and second prongs.

4. The eyewear of claim 1, wherein the slot comprises a narrower width at an anterior end relative to a width at a posterior end and is configured to provide a snap-fit engagement around the engagement structure to provide a coupling between the earstem and the frame.

5. The eyewear of claim 4, wherein the first and second prongs are configured to form a rotational coupling with the engagement structure to allow the earstem to pivot relative to the frame.

6. The eyewear of claim 1, wherein the earstem comprises at least one cavity configured to receive the latch component, the cavity comprising at least one pin and the latch component is configured to be pivotally supported within the cavity about the pin such that the latch component can be pivoted between the engaged position and a disengaged position to engage with or release the engagement structure.

7. The eyewear of claim 1, wherein the earstem comprises at least one cavity configured to receive the latch component, the latch component comprises at least one post configured to be received in a corresponding engagement feature of the earstem such that the latch component can be pivoted between the engaged position and a disengaged position to engage with or release the engagement structure.

8. The eyewear of claim 1 wherein the latch component comprises a hook portion formed at an anterior end of the latch component configured to engage with the engagement structure, an actuation tab formed at a posterior end of the latch component, and an aperture configured to receive a pin of the earstem.

9. The eyewear of claim 8, wherein depression of the actuation tab in a lateral direction relative to a longitudinal axis of the earstem advances the hook portion in a medial direction away from the engagement structure and pivots the latch component to the disengaged position.

10. The eyewear of claim 9, wherein lateral displacement of the hook portion relative to the longitudinal axis of the earstem advances the hook portion in a lateral direction towards the engagement structure such that the latch component can be engaged with the engagement structure.

11. The eyewear of claim 10, wherein the hook portion comprises a C-shaped hook comprising the slot of the latch component, the slot opening in a lateral direction relative to a longitudinal axis of the earstem when the latch component is in the engaged position.

12. The eyewear of claim 1, wherein the retention assembly comprises upper and lower pair of prongs with first and second slots formed respectively between each pair of prongs configured to receive the engagement structure and wherein the latch component is positioned between the upper and lower pair of prongs when the latch component is in the engaged position.

13. The eyewear of claim 12, wherein the retention assembly comprises a resilient mechanism configured to bias the latch component toward the engaged position.

14. The eyewear of claim 1, wherein the latch component is pivotally coupled to the earstem.

15. The eyewear of claim 1, wherein the first direction is an anterior direction relative to a longitudinal axis of the earstem and the second direction is one of a medial and lateral direction relative to a longitudinal axis of the earstem when the latch component is in the engaged position.

16. The eyewear of claim 1, wherein the first direction is one of a medial and lateral direction relative to a longitudinal axis of the earstem and the second direction is an anterior direction relative to a longitudinal axis of the earstem when the latch component is in the engaged position.

17. The eyewear of claim 1, wherein the latch component and the slot of the prong are configured to overlap at least partially in a superior-inferior orientation when the latch component is in the engaged position.

18. Eyewear comprising:
a frame;
at least one earstem having an anterior end and a posterior end; and
a retention assembly comprising at least one prong extending from the anterior end of the earstem and a latch component being slidably mounted relative to the earstem, the at least one prong comprising a slot which opens in one of a medial and lateral direction relative to a longitudinal axis of the earstem for receiving an engagement structure of the frame, the latch component comprising a slot which opens in an anterior direction relative to a longitudinal axis of the earstem, the latch component configured to overlap at least partially with the slot of the at least one prong such that the engagement structure of the frame is captured in the slots when the latch component is positioned in the engaged position, wherein the latch component restricts movement of the engagement structure out of the slot of the at least one prong of the earstem.

19. The eyewear of claim 18, wherein the latch component comprises an actuation tab configured to allow the user to move the latch component between the engaged and a disengaged position.

20. The eyewear of claim 18, wherein the retention assembly comprises a resilient mechanism configured to bias the latch component toward the engaged position.

21. The eyewear of claim 18, wherein the retention assembly comprises a screw mechanism configured to actuate the latch component between the engaged and disengaged positions.

22. The eyewear of claim 18, wherein the engagement structure comprises one of a hinge pin, recess, protrusion, detent, and aperture.

23. The eyewear of claim 18, wherein the latch component is pivotally coupled to the earstem.

24. The eyewear of claim 18, wherein the latch component and the slot of the prong are configured to overlap at least partially in a superior-inferior orientation when the latch component is in the engaged position.

* * * * *